United States Patent [19]

Maxson

[11] Patent Number: 4,732,931

[45] Date of Patent: Mar. 22, 1988

[54] HEAT CURABLE FLUOROSILICONE COATING COMPOSITION

[75] Inventor: Myron T. Maxson, Midland, Mich.

[73] Assignee: Dow Corning Corporation, Midland, Mich.

[21] Appl. No.: 917,329

[22] Filed: Oct. 9, 1986

[51] Int. Cl.$^4$ .................. C08G 77/06; C08L 83/04
[52] U.S. Cl. ................... 524/862; 524/861; 528/15; 528/31; 528/32; 525/478
[58] Field of Search .................. 528/15, 31, 32; 525/478; 523/209, 213; 524/861, 862

[56] References Cited

U.S. PATENT DOCUMENTS 3,511,698 5/1970 Talcott ..................... 117/138.8
4,585,848 4/1986 Evans ........................ 528/32

Primary Examiner—John C. Bleutge
Assistant Examiner—Ralph Dean, Jr.
Attorney, Agent, or Firm—Robert Spector

[57] ABSTRACT

The curable compositions of this invention comprise a solubilized vinyl-containing fluorosilicone gum, a curing agent for the gum, a platinum-containing hydrosilation catalyst, a treated reinforcing silica filler, and a volatile solvent for the gum and curing agent. The organosilicon compound used to treat the silica filler is critical to obtaining a homogeneous curable composition free of agglomerated particles, and is a hydroxyl terminated polydiorganosiloxane containing silicon-bonded fluorocarbon radicals.

7 Claims, No Drawings

HEAT CURABLE FLUOROSILICONE COATING COMPOSITION

BACKGROUND OF THE INVENTION

1. Field of the Invention

This invention relates to organosiloxane compositions. More particularly, this invention relates to solubilized heat curable compositions comprising a vinyl-containing fluorosilicone gum, an organohydrogensiloxane curing agent for the composition, a platinum containing hydrosilation catalyst, a dispersed treated reinforcing silica filler, and an inert, volatile solvent. Evaporation of the solvent followed by heating of the composition results in formation of a cured elastomeric fluorosilicone film.

2. Description of the Prior Art

Dispersions and solutions containing organosiloxane compositions that cure by a hydrosilation reaction to yield elastomeric products are known in the art. U.S. Pat. No. 3,511,698, which issued to Talcott on May 12, 1970, describes a method for preparing an electrical insulator. In accordance with this method a resin base member is coated with a liquid dispersion that includes as the film forming material a polydiorganosiloxane wherein the repeating units are dimethylsiloxane and/or 3.3.3-trifluoropropylmethyl siloxane units in combination with a plurality of either vinyl groups or silicon bonded hydrogen atoms. The compositions also include a curing agent for the composition a platinum hydrosilation catalyst and an inert volatile liquid as the dispersing medium. The composition is heated to evaporate volatile materials and cure the composition to an elastomeric coating.

Talcott's compositions can optionally contain fillers such as aluminum oxide and silica, both of which are exemplified. Example 3 of this patent describes a coating composition wherein the polyorganosiloxane is a high viscosity fluid containing methyl-3,3,3-trifluoropropylsiloxane. dimethylsiloxane, methylhydrogensiloxane and dimethylhydrogensiloxy units. The composition includes a silica filler that had been previously treated with 2,4,6-trimethyl-2,4,6-tris(3,3,3-trifluoropropyl)cyclotrisiloxane in the presence of ammonia.

The present inventor attempted to prepare coating compositions of the type described in the aforementioned Talcott patent by blending a fluorosilicone gum. a curing agent for the gum, a reinforcing silica filler. a number of different silica treating agents. including the cyclic siloxane exemplified by Talcott, and a platinum hydrosilation catalyst together with an organic liquid such as acetone that is a solvent for the gum. Of the silica treating agents evaluated only one type, a low molecular weight hydroxyl terminated poly(methyl-3,3,3-trifluoropropyl)siloxanes, yielded homogeneous compositions that were substantially free of agglomerated gel particles. These compositions are unique relative to those prepared using other silica treating agents in that they can be used as coating compositions without additional processing other than addition or removal of solvent to achieve the desired solids content.

An objective of this invention is to provide liquid. silica filled fluorosilicone coating compositions that cure by means of a platinum catalyzed hydrosilation reaction to yield elastomeric coatings. Other objectives will become apparent from the following specification and claims.

SUMMARY OF THE INVENTION

The curable compositions of this invention comprise a solubilized vinyl-containing fluorosilicone gum, an organohydrogensiloxane curing agent for the gum, a platinum-containing hydrosilation catalyst, a treated reinforcing silica filler, and a volatile solvent for the gum and curing agent. Elastomeric coatings are obtained by applying the compositions to a substrate allowing the solvent to evaporate under ambient conditions or by heating and then curing the coating at a temperature of at least about 70° C. The organosilicon compound used to treat the silica filler is critical to obtaining a homogeneous curable composition free of agglomerated particles. and is a hydroxyl terminated polydiorganosiloxane containing silicon-bonded fluorocarbon radicals.

As used herein the term "fluorosilicone gum" refers to curable high molecular weight polydiorganosiloxanes exhibiting viscosities of at least 1000 Pa.s at 25° C. At least 75 percent of the repeating units are represented by the general formula MeRfSiO and any remaining units are dimethylsiloxane and/or methylvinylsiloxane. The gum contains at least two vinyl radicals per molecule and exhibits a Williams plasticity number of from 120 to 400.

In the foregoing formula for the repeating units Me represents methyl and Rf represents a perfluoroalkylethyl radical containing from 3 to 10 carbon atoms.

DETAILED DESCRIPTION OF THE INVENTION

This invention provides curable liquid compositions exhibiting a viscosity of from 0.01 to 10 Pa.s at 25° C.. said compositions comprising the product obtained by blending to homogeniety (a) a fluorosilicone gum exhibiting a Williams plasticity number of from 120 to 400 at 25° C., where at least 75 mole percent of the repeating units of said gum correspond to the formula MeRfSiO. Me represents methyl. Rf represents a perfluoroalkylethyl radical containing a total of from 3 to 10 carbon atoms, any remaining units are dimethylsiloxane or methylvinylsiloxane, and the gum contains from 0.3 to 3.0 mole percent of silicon-bonded vinyl radicals;

(b) a compatible organohydrogensiloxane containing an average of at least 3 silicon-bonded hydrogen atoms per molecule in an amount sufficient to cure said composition;

(c) a platinum-containing hydrosilation catalyst in an amount sufficient to promote curing of said composition;

(d) from 1 to 50 percent by weight, based on the weight of said composition, of a finely divided treated reinforcing silica filler prepared by treating said filler with an effective amount of a siloxane of the general formula $HO(MeRfSiO)_nH$ where the average value of n is from 3 to 12, and (e) a volatile solvent for (a), (b) and (c).

A distinguishing feature of the present compositions is the treating agent for the reinforcing silica filler. It is known that reinforcing silica fillers used in organosiloxane compositions typically require treatment with at least one of a variety of relatively low molecular weight, liquid organosilicon compounds to prevent a phenomenon referred to "creping". Creping is characterized by an increase in the viscosity or plasticity of a silica-filled organosiloxane composition to the extent that it becomes extremely difficult or impossible to process using conventional techniques and equipment.

The filler can be treated before being combined with other ingredients of an organosiloxane composition, however it is often desirable from the standpoint of process efficiency to add the treating agent at the time the filler is combined with the curable polyorganosiloxane that together with the filler constitutes the major portion of the organosiloxane composition.

Silica treating agents typically contain a plurality of hydroxyl or other functional groups which react with the hydroxyl groups present on the surface of the silica particles. and include silanes siloxanes and silazanes. Cyclic siloxanes will react in the presence of various compounds such as ammonia and water to yield useful silica treating agents.

Only one class of silica treating agents has been found capable of producing homogeneous dispersions of silica in solutions of fluorosilicone gums prepared using volatile organic liquids, particularly ketones, as the solvent. The treating agents of this invention are hydroxyl terminated polydiorganosiloxanes represented by the general formula $HO(MeR_fSiO)_nH$, where Me. Rf and n are as defined hereinabove.

The radical represented by Rf is preferably 3,3,3-trifluoropropyl, based on the availability of the corresponding intermediates, and the value for n is preferably from 3 to 6, inclusive.

Using the present treating agents smooth, uniform dispersions of silica particles in a solubilized fluorosilicone gum can be prepared by simply mixing these ingredients together with a volatile organic solvent in the absence of any substantial shearing force. Preferred methods for blending the ingredients of the present compositions are described hereinafter.

The accompanying examples demonstrate that when these low shear blending techniques are used with a treated silica prepared using other conventional silica treating agents the final dispersion contains agglomerated particles that cannot be dissolved or dispersed by additional stirring.

The use of colloid mills or other equipment capable of subjecting liquid dispersions to high shear may break up these particles sufficiently to form compositions resembling those of the present invention, however such procedures are undesirable not so much because of the additional processing steps required as the danger of igniting the volatile organic dispersing vehicle during exposure to the heat generated by the shearing forces.

The amount of silica treating agent required to prepare a useful dispersion of this invention will be determined at least in part by the concentrations of silica and fluorosilicone gum and the molecular weight of the gum. Typically from about 5 to about 50 parts by weight of the treating agent are used for each 100 parts of silica.

The curable fluorosilicone gums that constitute one ingredient (referred to hereinafter as ingredient A) of the present compositions are known materials and have been thoroughly described in the prior art. The gums are high molecular weight. substantially linear polydiorganosiloxanes that typically exhibit viscosities of at least about 1000 Pa.s at 25° C. These materials are thermoplastic in the uncured form and flow to a limited extent even at room temperature, i.e. about 25° C.

The viscosity of organosiloxane gums is typically expressed in terms of a Williams plasticity number that is determined in accordance with ASTM test procedure D926-67. Typical plasticity values are between 120 and 400. The gum may contain a small degree of branching to modify the properties of the cured elastomer.

A minimum of 75 percent of the diorganosiloxane units in ingredient A are represented by the formula $MeR_fSiO$. where Rf and Me are as defined hereinabove. Any remaining diorganosiloxane units contain two non-fluorinated hydrocarbon radicals from 1 to 10 carbon atoms each, and are exemplified by dimethylsiloxane and/or methylvinylsiloxane. Curable fluorosilicone gums typically contains from 0.5 to about 2.0 percent by weight of silicon bonded vinyl radicals that can be located at terminal or non-terminal positions on the molecules.

Preferred gums are poly(methyl-3,3,3-trifluoropropyl)siloxanes that include from 0.5 to about 1 mole percent of methylvinylsiloxane units and from 0 to 24.5 mole percent of dimethylsiloxane units.

Polydiorganosiloxane gums, including those of the present compositions, are typically prepared by polymerizing a corresponding cyclosiloxane, such as 2,4,6-trimethyl-2,4,6-tris(3,3,3-trifluoropropyl)cyclotrisiloxane. The polymerizations are conducted in the presence of acid or base catalysts and a controlled amount of water. Alternatively the corresponding halosilane(s) are polymerized in the presence of a suitable catalyst and an acid acceptor.

Ingredient A is cured by a hydrosilation reaction between the ethylenically unsaturated hydrocarbon radicals of this ingredient and the silicon-bonded hydrogen atoms of the curing agent (ingredient B).

Ingredient B is typically a liquid organohydrogensiloxane containing an average of at least three silicon bonded hydrogen atoms per molecule. This ingredient can contain from as few as four silicon atoms per molecule up to an average of 20 or more, and exhibits a viscosity of up to 10 Pa.s or higher at 25° C. Ingredient B contains repeating units of the formulae $HSiO_{1.5}$, $R'HSiO$ and/or $R'_2HSiO_{0.5}$.

The molecules of ingredient B can optionally include one or more monoorganosiloxane, diorganosiloxane, triorganosiloxy and $SiO_2$ units that do not contain silicon bonded hydrogen atoms. Each R' in the formulae for ingredient B is individually selected from monovalent hydrocarbon or fluorohydrocarbon radicals containing from 1 to about 10 carbon atoms. Alternatively ingredient B can be either a cyclic compound containing diorganosiloxane and organohydrogensiloxane units or a compound of the formula $Si(OSiR'_2H)_4$.

Preferably at least a portion of the R' radicals are identical to the Rf radicals of ingredient A in order to achieve compatibility between these two ingredients. One preferred embodiment of ingredient B is a linear dimethylhydrogensiloxy terminated polyorganosiloxane containing an average of from one to about five repeating units per molecule of the formula

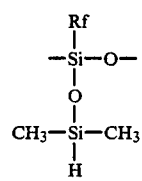

The molecular weights of ingredients A and B together with the number and distribution of the silicon-bonded hydrogen atoms and ethylenically unsaturated hydrocarbon radicals within these ingredients will determine the location of crosslinks in the cured elastomer. The concentration of crosslinks per unit area is often referred to as the "crosslink density" and determines certain physical properties of the cured elastomer particularly hardness, compressibility and resiliency. The particular combinations of polydiorganosiloxane(s) and curing agent(s) yielding the desired combination of physical properties can readily be determined by routine experimentation with a knowledge of this invention.

The molar ratio of silicon bonded hydrogen atoms to vinyl or other ethylenically unsaturated hydrocarbon radicals present in the curable compositions of this invention is a major factor in determining the properties of the cured elastomer.

Because of the difficulty often experienced in achieving a complete reaction between all of the silicon bonded hydrogen atoms and all of the vinyl or other ethylenically unsaturated hydrocarbon radicals present in the reaction mixture. it is desirable to have an stoichiometric excess of one of these species in a curable composition. In the present compositions this ratio is from about 1.3 to about 2.0 silicon bonded hydrogen atoms per vinyl or other ethylenically unsaturated hydrocarbon radical. The preferred ratio for a given composition will be determined at least in part by the average molecular weight of ingredient A and the type of curing agent.

Hydrosilation reactions are typically conducted in the presence of a catalyst that is a platinum group metal or a compound of such a metal. Platinum compounds such as hexachloroplatinic acid and particularly complexes of these compounds with relatively low molecular weight vinyl-containing organosiloxane compounds are preferred catalysts because of their high activity and compatibility with the organosiloxane reactants. These complexes are described in U.S. Pat. No. 3.419,593 that issued to David N. Willing on Dec. 31, 1968. Complexes wherein the silicon bonded hydrocarbon radicals are methyl, vinyl and 3.3,3-trifluoropropyl are particularly preferred because of their ability to catalyze a rapid curing of the elastomer at temperatures of at least about 70° C.

The platinum containing catalyst can be present in an amount equivalent to as little as one part by weight of platinum per one million parts of curable composition. Catalyst concentrations equivalent to from 5 to 50 parts of platinum per million of curable composition are preferred to achieve a practical curing rate. Higher concentrations of platinum provide only marginal improvements in curing rate, and are therefore economically unattractive, particularly when the preferred catalysts are used.

Mixtures containing all of the foregoing reactants may begin to cure at ambient temperature. To obtain a longer working time or "pot life" once all of the ingredients have been blended, the activity of the catalyst can be retarded or suppressed under ambient conditions by the addition of an inhibitor.

One class of inhibitors includes the acetylenic compounds disclosed in U.S. Pat. No. 3,445,420. which issued on May 20. 1969 to Kookootsedes et al. Acetylenic alcohols such as 2-methyl-3-butyn-2-ol constitute a preferred class of inhibitors that will suppress the activity of the catalyst at 25° C. Compositions containing these catalysts typically require heating at temperatures of 70° C. or above to cure at a practical rate.

An increase in the pot life of a curable composition can also be achieved using an olefinically substituted siloxane of the type described in U.S. Pat. No. 3,989,667, which issued on Nov. 2, 1976 to Lee and Marko. Cyclic methylvinylsiloxanes are preferred.

Inhibitor concentrations as low as one mole of inhibitor per mole of platinum will in some instances impart satisfactory storage stability and cure rate. In other instances inhibitor concentrations of up to 500 or more moles of inhibitor per mole of platinum are required. The optimum concentration for a given inhibitor in a given composition can readily be determined by routine experimentation and does not constitute part of this invention.

The present compositions contain from about 1 to about 50 percent by weight based on the weight of the composition of a finely divided silica filler. Polyorganosiloxane gums typically require reinforcing fillers such as finely divided silica in order to develop significant physical properties such as tensile strength, toughness and modulus following curing. Finely divided silicas include both the fume and precipitated forms. To achieve the optimum combination of physical properties the filler is preferably a fume silica having a surface area of greater than about 100 square meters per gram.

The silica treating agents that will prevent "creping" of the solubilized gum and not interfere with formation of a homogeneous dispersion of the filler in the solubilized fluorosilicone gum are described in a preceding section of this specification.

The remaining required ingredient of the present compositions is a volatile organic liquid that is a solvent for the fluorosilicone gum and the organohydrogensiloxane curing agent in addition to being a suitable dispersing agent for the treated silica filler. Fluorosilicone gums are typically soluble in many polar organic liquids such as ketones and chlorinated hydrocarbons such as methylene chloride. Preferred solvents include ketones containing from 3 to about 8 carbon atoms. Acetone and methyl isobutyl ketone are particularly preferred based on their cost and availability. The organic liquid typically constitutes from about 50 to about 90 percent by weight of the composition. This range is not critical, and will be determined at least in part by the desired viscosity of the composition which is, in turn a function of the molecular weight of the fluorosilicone gum and the amount of silica filler present in the composition.

In addition to the required ingredients discussed in the preceding paragraphs the present compositions may contain optional ingredients that are conventionally added to silicone elastomers to modify existing properties or impart new ones. Typical additives of this type include but are not limited to non-reinforcing fillers, pigments adhesion promoters, heat stabilizers, thermally and/or electrically conductive materials. flame retardants and anti-oxidants. Liquid and resinous polyorganosiloxanes that are compatible with the fluorosilicone gum and the other ingredients of the present compositions can also be used to facilitate processing of the curable composition or to modify the properties of the final cured elastomer.

The curable compositions of this invention can be prepared by blending all of the ingredients to form a homogeneous dispersion of the treated silica filler in a solution comprising the fluorosilicone gum, curing agent and platinum catalyst with the aforementioned volatile organic liquid as the solvent. If additional ingredients are present, these should either dissolve or be uniformly dispersed in the composition, depending upon their solubility in the volatile organic liquid. Solid materials that would tend to agglomerate in the composition should be avoided.

In accordance with a preferred method for preparing the present compositions, a fluorosilicone gum is blended with a reinforcing silica filler and the silica treating agent in a suitable mixer to form a homogeneous base material. Dough type mixers are particularly preferred for this operation. The resultant base material is then blended with the remaining ingredients of the present compositions other than the volatile liquid.

A composition of this invention is prepared by combining the resultant mixture together with the volatile organic liquid at ambient temperature using a minimum amount of shearing forces. Preferred techniques include stirring the combined ingredients using either a low speed stirring blade or enclosing the ingredients in a cylindrical container that is then rotated for several hours to produce a homogeneous dispersion that is substantially free of agglomerates.

Even when the aforementioned catalyst inhibitors are present compositions containing a fluorosilicone gum, the curing agent and the platinum hydrosilation catalyst may begin to cure at ambient temperature. When it is desired to store the present compositions for longer than several hours before curing it, the curing agent and platinum-containing catalyst should be packaged separately as a two part composition.

Part I of the present two part compositions typically includes at least one of the solubilized fluorosilicone gums described hereinbefore as ingredient A, the treated silica filler, the platinum containing catalyst, the volatile organic liquid and an optional catalyst inhibitor.

Part II contains the solubilized fluorosilicone gum, treated filler and organohydrogensiloxane curing agent (ingredient B).

Parts I and II each typically exhibit viscosities of up to 10 Pa.s at 25° C. To facilitate blending and transfer of the compositions and minimize entrapment of air during mixing a viscosity of from 0.1 to 1 Pa.s at 25° C. is preferred.

If the ingredients are packaged as two part compositions, small quantities of each part can be blended to prepare the present compositions using manual mixing. Larger batches typically require motor driven equipment such as a rotating drum or a propeller type mixer. For convenience in formulating it is preferred that parts I and II be combined in a 1:1 volume ratio to prepare a curable composition.

Irrespective of the method by which the present compositions are prepared, they are cured by evaporating the volatile organic liquid and allowing the ingredients to react at ambient or elevated temperature. Compositions containing a catalyst inhibitor typically require heating to temperatures of 70° C. or above to achieve a fully cured state within a reasonable time interval, usually from several minutes to an hour.

The cured, fluorosilicone elastomers prepared using the present compositions typically exhibit tensile strengths of from 3.5 to about 7 megapascals measured in accordance with American Society of Testing and Materials (ASTM) test method D412, elongations within the range of from 200 to 400 percent, durometer hardness values of from 10 to 60. measured on the Shore A durometer scale in accordance with ASTM test method no. D 2240. and die B tear strengths of at least 8.75 kilonewtons per linear meter, measured using ASTM test method no. D 624.

The compositions of this invention typically exhibit viscosities of from 0.01 to 10 Pa.s at 25° C. The compositions are particularly useful for applying relatively thin fluorosilicone coatings to a variety of organic and inorganic substrates, including glasses, metals, ceramics, organic polymers and polyorganosiloxanes. Depending upon the solids content of the composition, the thickness of the cured coating resulting from a single application of the composition is from 0.025 to 0.25 mm.

Elastomeric coatings prepared by curing the present compositions are particularly useful for coating or encapsulating materials, including other silicone elastomers that are exposed to non-polar organic liquids such as gasoline and jet engine fuel and which are susceptible to being softened or dissolved by these liquids.

The following examples describe preferred embodiments of the present compositions and should not be interpreted as limiting the scope of the invention described in the accompanying claims.

EXAMPLE 1

This example describes the preparation and curing of a two-part composition of this invention.

The fluorosilicone gum was a hydroxyl terminated polydiorganosiloxane containing 99.4 mole percent of methyl-3,3,3-trifluoropropylsiloxane units and 0.6 mole percent of methylvinylsiloxane units. The gum exhibited a Williams plasticity number of 279 in accordance with ASTM procedure No. D926-67.

The fluorosilicone gum (70.4 parts) was blended together with (1) 1.4 parts of a liquid dimethylvinylsiloxy terminated polydiorganosiloxane containing 78 mole percent of dimethylsiloxy units; 22 mole percent methylvinylsiloxy units and exhibiting a viscosity of about 10 Pa.s at 25° C.; (2) 7 parts of a hydroxyl terminated poly(methyl-3,3,3-trifluoropropyl)siloxane containing an average of 3 repeating units per molecule; (3) 21 parts of fume silica with a surface area in excess of 200 m²/g. and (4) 1 part of ammonium carbonate. The ingredients were blended in a dough type mixer at a temperature of 170° C. for about two hours under reduced pressure to remove volatile materials. The resultant mixture will be referred to hereinafter as I.

Part A of the two part composition was prepared by blending the following ingredients in dough type mixer at ambient temperature for sufficient time to obtain a homogeneous material, 100 parts of I. and 5 parts by weight of a catalyst prepared by reacting 1 part of hexachloroplatinic acid with 50 parts of a dimethylvinylsiloxy terminated poly(methyl-3,3,3-trifluoropropyl)-siloxane containing an average of 3 repeating units per molecule.

Part B of the two part composition was prepared by blending the following ingredients in a dough type mixer at ambient temperature for sufficient time to obtain a homogeneous composition: 100 parts I and 30 parts of an organohydrogensiloxane of the average formula

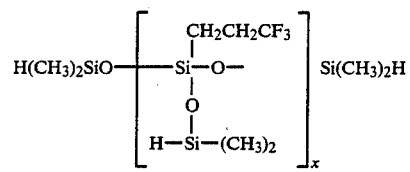

where the value of x is from 1 to 3, inclusive.

Equal weights (17.6 parts) of parts A and B were each blended with 100 parts of methyl ethyl ketone by placing the ingredients in a cylindrical container and rotating the container for about 8 hours at ambient temperature. Both of the resultant compositions were free of agglomerated particles and consisted essentially of a homogeneous dispersion of the treated silica filler in a solution of the remaining ingredients. Each part contained 15 percent by weight of non volatile materials. The viscosity of part A was 0.13 Pa.s and the viscosity of part B was 0.12 Pa.s.

Equal parts of A and B were mixed together to form a homogeneous curable composition of this invention and the resultant mixture was poured into a flat bottomed container to form a layer of about 0.2 mm in thickness. The coating was exposed to ambient conditions for about 16 hours, at which time it was not completely cured. The container was then heated for 30 minutes in an oven maintained at a temperature of 150° C. to yield a cured 0.13 mm.-thick elastomeric film exhibiting the following properties: a tensile strength of 6.7 megapascals: a maximum elongation of 634%: and a modulus at 100 percent elongation of 215.

The procedure and ingredients described in the first part of this example were used to prepare and cure a two-part composition, each part of which contained 25 percent by weight of non-volatile materials. The cured film exhibited the following properties: a tensile strength of 6.8 megapascals; a maximum elongation of 665%; and a modulus at 100 percent elongation of 111.

EXAMPLE 2 (COMPARISON)

This example describes compositions wherein the silica treating agent is outside the scope of this invention. The resultant composition contains agglomerated particles that cannot be broken up by low shear mixing.

A two-part curable composition was prepared using the general procedure described in example 1.

The fluorosilicone gum described in the foregoing Example 1 (76.4 parts) was blended together with (1) 1.4 parts of a polydimethylsiloxane gum of similar plasticity (2) 6.1 parts of a hydroxyl terminated polydimethylsiloxane containing an average of 4 repeating units per molecule, (3) 16.1 parts of a fumed silica having a surface area in excess of 200 m$^2$/g., and (4) 1 part of ammonium carbonate. These ingredients were blended in a dough type mixer at a temperature of 170° C. for about 2 hours under reduced pressure to remove volatile materials. The resultant mixture will be referred to hereinafter as II.

Part A of a two-part composition was prepared by blending 60 parts of II, 240 parts of methyl ethyl ketone and 0.209 part of the same catalyst described in the preceding example 1 in a rotating cylinder for eight hours. The resultant dispersion was non-homogeneous and contained agglomerated particles that could not be eliminated or substantially reduced in size by blending the material in a rotating cylinder for an additional 72 hours.

Part B of a two-part composition was prepared by blending 60 parts of II. 1.26 parts of the organohydrogensiloxane described in the preceding Example 1 and 240 parts of methyl ethyl ketone. The resultant composition was blended in a rotating cylinder as described in the procedure for preparing part A of this example with identical results. The composition contained agglomerated particles that could not be eliminated or substantially reduced in size following 72 hours of additional blending.

The procedure for preparing parts A and B of this example were repeated with the exception that the methyl ethyl ketone was replaced with an equal weight of acetone. The final result was the same, namely it was not possible to prepare a homogeneous dispersion of the silica filled gum.

EXAMPLE 3 (COMPARISON)

The following ingredients were blended in a dough type mixer as described in the foregoing Example 1: (1) 6.2 parts of the fluorosilicone gum described in the preceding example 1, (2) 55.6 parts of a fluorosilicone gum of similar plasticity but free of methylvinylsiloxane units, (3) 1.8 parts of a liquid dimethylvinylsiloxy terminated polydiorganosiloxane containing 78 mole percent of dimethylsiloxy units 22 mole percent methylvinylsiloxy units, and exhibiting a viscosity of about 16 Pa.s at 25° C., (4) 9.2 parts of sym-tetramethyldi(3,3,3-trifluoropropyl)disilazane, (5) 27.2 parts of a fumed silica having a surface area greater than 200 m$^2$/g., and (6) 1.2 parts of water. The resultant composition will be referred to hereinafter as III.

Part A of a two part composition was prepared by blending the following ingredients in a rotating cylinder as described in the preceding Examples: 60 parts of III, 240 parts of methyl ethyl ketone and 0.209 parts of the catalyst described in the preceding example 1. After being blended for eight hours the composition contained agglomerated particles and was not homogeneous. Blending the composition for an additional 72 hours did not improve the homogeniety.

Part B of the composition was prepared by blending the following ingredients in a rotating cylinder for eight hours, 60 parts of III, 240 parts of methyl ethyl ketone and 1.01 parts of the organohydrogensiloxane described in the preceding example 1. The result was the same as described for part A of this example, namely the composition contained agglomerates that could not be removed or substantially reduced in size by additional blending.

EXAMPLE 4

This example describes a composition of this invention. The composition was prepared by blending the following ingredients in a dough type mixer under the conditions described in the preceding Example 1: 62.5 parts of the same fluorosilicone gum described in Example 1, 11.2 parts of the hydroxyl terminated poly(methyl-3.3.3-trifluoropropyl)siloxane described in Example 1. and 26.3 parts of a fumed silica having a surface area in excess of 300 m$^2$/g. and 1 part of ammonium carbonate. The resultant composition is referred to hereinafter as IV.

Part A of a two part composition was prepared by blending the following ingredients in a rotating cylinder: (1) 60 parts of IV. (2) 240 parts of methyl ethyl ketone. and (3) 0.21 part of the platinum catalyst described in the preceding Example 1. A smooth, homogeneous composition free of agglomerated particles was obtained following eight hours of blending. The viscosity of this composition was $2.94 \times 10^{-4}$ m$^2$/second.

Part B of the same two part composition was prepared in a similar manner by blending the following ingredients in a rotating cylinder for eight hours: (1) 60 parts of IV, (2) 240 parts of methyl ethyl ketone, and (3) 1.01 parts of the same organohydrogensiloxane described in Example 1. The resultant composition was a homogeneous dispersion of the filler in a solution of the organosiloxane materials, and was free of agglomerated particles.

A curable composition of this invention was prepared by blending equal weights of parts A and B. The composition was then poured into a flat bottomed container to form a continuous layer and the solvent was allowed to evaporate under ambient conditions for about 16 hours, at which time the layer of material was not completely cured. The container was then heated for 30 minutes in an oven maintained at a temperature of 150° C. to yield a cured elastomeric film exhibiting the following properties:

Tensile Strength: 6.7 Megapascals
Elongation at Break: 535%
Modulus at 100% elongation: 181

That which is claimed is:

1. A curable liquid composition exhibiting a viscosity of from 0.01 to 10 Pa.s at 25° C., said composition comprising the product obtained by blending to homogeneity
   (a) a fluorosilicone gum exhibiting a Williams plasticity number of from 120 to 400 at 25° C., where at least 75 mole percent of the repeating units of said gum correspond to the formula MeRfSiO, Me represents methyl, Rf represents a perfluoroalkylethyl radical containing a total of from 3 to 10 carbon atoms, any remaining units are individually selected from the group consisting of dimethylsiloxane and methylvinylsiloxane units, and the gum contains from 0.3 to 3 mole percent of silicon-bonded vinyl radicals;
   (b) an organohydrogensiloxane containing an average of at least 3 silicon-bonded hydrogen atoms per molecule in an amount sufficient to cure said composition, where at least a portion of the silicon bonded hydrocarbon radicals present in said organohydrogensiloxane are represented by Rf;
   (c) a platinum-containing hydrosilation catalyst in an amount sufficient to promote curing of said composition;
   (d) from 1 to 25 percent by weight, based on the weight of said composition, of a finely divided reinforcing silica filler prepared by treating said filler with an effective amount of a siloxane of the general formula HO(MeRfSiO)$_n$H where the average value of n is from 3 to 12, and
   (e) a volatile solvent for (a), (b) and (c).

2. A composition according to claim 1 where Rf is 3,3,3-trifluoropropyl, the fluorosilicone gum contains from 0.5 to 1.0 mole percent methylvinylisiloxy units and from 0 to 24.5 mole percent of dimethylsiloxy units, the organohydrogensiloxane is selected from the group consisting of (1) linear polyorganohydrogensiloxanes comprising repeating units that are, in turn, selected from the group consisting of HSiO$_{1.5}$, R' HSiO, and R'$_2$HSiO$_{\frac{1}{2}}$, (2) cyclic organohydrogensiloxanes containing diorganosiloxane and organohydrogensiloxane units, and (3) compounds of the formula Si(OSiR'$_2$H)$_4$ where each R' individually represents a monovalent hydrocarbon or fluorohydrocarbon radical and contains from 1 to 10 carbon atoms, with the proviso that at least a portion of the R' radicals present in said organohydrogensiloxane are Rf and the molar ratio of silicon bonded hydrogen atoms to vinyl radicals in said composition is from 1.3 to 2.0, inclusive.

3. A composition according to claim 2 where said organohydrogensiloxane consists essentially of dimethylhydrogensiloxy terminal units and from 1 to 5 units of the formula

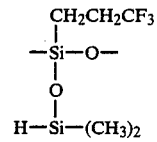

and the hydrosilation catalyst is a complex of hexachloroplatinic acid with a liquid vinyl-containing organosiloxane.

4. A composition according to claim 3 where the fluorosilicone gum consists essentially of methyl-3,3,3-trifluoropropylsiloxane units and from 0.5 to 1 mole percent of methylvinylsiloxane units, and the composition contains an inhibitor for the platinum catalyst.

5. A composition according to claim 4 that contains as an additional ingredient a liquid dimethylvinylsiloxy terminated polydiorganosiloxane wherein the repeating units are selected from the group consisting of dimethylsiloxy and methylvinylsiloxy.

6. A composition according to claim 1 where the ingredients of said composition are packaged in two parts which are combinable to form said composition, the first of said parts comprising the fluorosilicone gum, treated silica filler (d), platinum-containing catalyst (c) and volatile solvent (e), and the second of said parts comprising the fluorosilicone gum, treated silica filler (d) and organohydrogensiloxane (b).

7. A composition according to claim 6 where each of said parts contains from 10 to 50 weight percent of non-volatile materials and exhibits a viscosity of from 0.01 to 10 Pa.s at 25° C.

* * * * *